(12) United States Patent
Kato et al.

(10) Patent No.: US 11,566,680 B2
(45) Date of Patent: Jan. 31, 2023

(54) VALVE DEVICE AND SHOCK ABSORBER

(71) Applicant: KYB CORPORATION, Tokyo (JP)

(72) Inventors: Hidemasa Kato, Tokyo (JP); Ryosuke Kamakura, Tokyo (JP)

(73) Assignee: KYB Corporation, Tokyo (JP)

( * ) Notice: Subject to any disclaimer, the term of this patent is extended or adjusted under 35 U.S.C. 154(b) by 77 days.

(21) Appl. No.: 16/979,426

(22) PCT Filed: Mar. 6, 2019

(86) PCT No.: PCT/JP2019/008813
§ 371 (c)(1),
(2) Date: Sep. 9, 2020

(87) PCT Pub. No.: WO2019/176678
PCT Pub. Date: Sep. 19, 2019

(65) Prior Publication Data
US 2021/0010558 A1      Jan. 14, 2021

(30) Foreign Application Priority Data

Mar. 13, 2018  (JP) .............................. JP2018-045347
Mar. 13, 2018  (JP) .............................. JP2018-045348

(51) Int. Cl.
*F16F 9/34*       (2006.01)
*F16F 9/19*       (2006.01)
(Continued)

(52) U.S. Cl.
CPC .............. *F16F 9/3488* (2013.01); *F16F 9/19* (2013.01); *F16F 9/516* (2013.01); *F16K 15/18* (2013.01);
(Continued)

(58) Field of Classification Search
CPC .. F16F 9/3488; F16F 9/19; F16F 9/516; F16F 9/065; F16F 2222/12; F16F 2228/066;
(Continued)

(56) References Cited

U.S. PATENT DOCUMENTS 4,786,034 A * 11/1988 Heess ................ B60G 17/0152
                                                           267/64.15
5,996,748 A * 12/1999 Nezu ......................... F16F 9/06
                                                              188/313
(Continued)

FOREIGN PATENT DOCUMENTS

EP          3067584 A1 *  9/2016  .......... B60G 15/062
JP          H01-100941 U    7/1989
(Continued)

OTHER PUBLICATIONS

Nov. 19, 2021, European Search Report issued for related EP Application No. 19767605.9.
(Continued)

*Primary Examiner* — Robert A. Siconolfi
*Assistant Examiner* — James K Hsiao
(74) *Attorney, Agent, or Firm* — Paratus Law Group, PLLC

(57) ABSTRACT

Provided is a valve device and a shock absorber that can prevent them from being in a failure state at the normal time and can freely set a passive valve even when both pressure control and passage opening/closing are performed by a solenoid valve. For this reason, the valve device includes a first passage and a second passage connected downstream of the pressure introducing passage, a solenoid valve that opens the first passage to control the upstream pressure and closes the second passage when energized, and that closes the first
(Continued)

passage and opens the second passage when not energized, and a passive valve provided downstream of the solenoid valve in the second passage.

7 Claims, 6 Drawing Sheets

(51) Int. Cl.
| | |
|---|---|
| *F16K 15/18* | (2006.01) |
| *B60G 13/08* | (2006.01) |
| *F16F 9/348* | (2006.01) |
| *F16F 9/516* | (2006.01) |
| *F16K 31/06* | (2006.01) |
| *B60G 17/08* | (2006.01) |
| *F16F 9/06* | (2006.01) |

(52) U.S. Cl.
CPC .......... *F16K 31/0613* (2013.01); *B60G 13/08* (2013.01); *B60G 17/08* (2013.01); *B60G 2202/24* (2013.01); *B60G 2206/41* (2013.01); *B60G 2500/11* (2013.01); *B60G 2600/182* (2013.01); *B60G 2800/162* (2013.01); *F16F 9/065* (2013.01); *F16F 2222/12* (2013.01); *F16F 2228/066* (2013.01); *F16F 2230/18* (2013.01); *F16F 2232/08* (2013.01); *F16F 2234/02* (2013.01)

(58) Field of Classification Search
CPC ............... F16F 2230/18; F16F 2232/08; F16F 2234/02; F16F 15/18; F16F 31/0613; B60G 13/08; B60G 17/08; B60G 2202/24; B60G 2206/41; B60G 2500/11; B60G 2600/182; B60G 2800/162
See application file for complete search history.

(56) References Cited

U.S. PATENT DOCUMENTS

| | | | | |
|---|---|---|---|---|
| 6,371,262 | B1* | 4/2002 | Katou | F16F 9/465 |
| | | | | 188/266.5 |
| 6,782,980 | B2* | 8/2004 | Nakadate | F16F 9/3214 |
| | | | | 188/313 |
| 6,860,370 | B2* | 3/2005 | Nakadate | F16F 9/466 |
| | | | | 188/282.5 |
| 8,573,606 | B1* | 11/2013 | Kim | B60G 13/08 |
| | | | | 280/6.157 |
| 8,794,400 | B2* | 8/2014 | Nakadate | F16F 9/464 |
| | | | | 188/266.6 |
| 9,428,030 | B2* | 8/2016 | Teraoka | F16F 9/5126 |
| 9,506,520 | B2* | 11/2016 | Kim | F16F 9/34 |
| 9,550,545 | B2* | 1/2017 | Murakami | F16F 9/34 |
| 9,796,236 | B2* | 10/2017 | Inagaki | F16F 9/348 |
| 9,810,280 | B2* | 11/2017 | Hagidaira | F16F 9/3481 |
| 9,834,054 | B2* | 12/2017 | Teraoka | B60G 13/08 |
| 10,634,207 | B2* | 4/2020 | Yuno | F16F 9/3214 |
| 10,634,209 | B2* | 4/2020 | Smeljanskij | F16F 9/19 |
| 11,220,253 | B2* | 1/2022 | Ford | F02D 17/02 |
| 2014/0216871 | A1* | 8/2014 | Shibahara | F16F 9/46 |
| | | | | 188/313 |
| 2016/0025237 | A1 | 1/2016 | Mori et al. | |

FOREIGN PATENT DOCUMENTS

| | | |
|---|---|---|
| JP | H11-037199 A | 2/1999 |
| JP | 2010-038348 A | 2/2010 |
| JP | 2014-173716 A | 9/2014 |
| WO | WO 2013/015358 A1 | 1/2013 |

OTHER PUBLICATIONS

Jul. 5, 2021, Chinese Office Action issued for related CN application No. 201980017236.7.
Jun. 8, 2021, Japanese Office Action issued for related JP application No. 2018-045347.

\* cited by examiner

VALVE DEVICE AND SHOCK ABSORBER

CROSS REFERENCE TO PRIOR APPLICATION

This application is a National Stage Patent Application of PCT International Patent Application No. PCT/JP2019/008813 (filed on Mar. 6, 2019) under 35 U.S.C. § 371, which claims priority to Japanese Patent Application Nos. 2018-045347 (filed on Mar. 13, 2018) and 2018-045348 (filed on Mar. 13, 2018), which are all hereby incorporated by reference in their entirety.

TECHNICAL FIELD

The present invention relates to a valve device and a shock absorber including the valve device.

BACKGROUND ART

The valve device is used, for example, as a damping valve that makes the damping force of a shock absorber interposed between a vehicle body and an axle of a vehicle variable.

For example, as disclosed in JP 2014-173716 A, such a damping valve includes a main valve body that gives resistance to the liquid flow generated when the shock absorber extends and contracts, a pressure introducing passage for reducing and leading the pressure upstream of the main valve body to the back face of the main valve body, a first passage connected downstream of the pressure introducing passage, a solenoid valve including a pressure control valve valve body that controls a valve opening pressure when opening the first passage and an opening/closing valve valve body that opens and closes the downstream side relative to the pressure control valve valve body, a second passage connected between the pressure control valve valve body and the opening/closing valve valve body in the first passage, and a passive valve provided in this second passage, and when the solenoid valve is energized, opens the opening/closing valve valve body to control the valve opening pressure of the pressure control valve valve body, and when the solenoid valve is not energized, closes the opening/closing valve valve body to allow a liquid to flow to the passive valve.

According to the above configuration, the valve opening pressure of the pressure control valve valve body can be controlled and the back pressure of the main valve body can be controlled to the valve opening pressure of the pressure control valve valve body at the normal time when the power is supplied to the solenoid valve. When the back pressure of the main valve body is adjusted to have a large or a small value, the resistance according to the main valve body changes. Therefore, when the back pressure is controlled, the damping force generated by the shock absorber can be made large or small to change the damping force characteristics. On the other hand, at the time of failure when the power supply to the solenoid valve is cut off, the liquid passes through the passive valve. Therefore, the back pressure of the main valve body is determined by setting the passive valve at the time of failure. In other words, even when the power supply to the solenoid valve is cut off, the shock absorber can exert a predetermined damping force, which results in fail-safe.

SUMMARY OF INVENTION

The valve body (solenoid valve valve body) of the solenoid valve included in the conventional damping valve described above has a configuration in which the pressure control valve valve body and the opening/closing valve valve body that opens and closes the downstream side relative to the pressure control valve valve body are integrated, and move linearly in the same direction at the same time. When the solenoid valve valve body moves to one side, the pressure control valve valve body approaches the corresponding valve seat (pressure control valve valve seat) and the opening/closing valve valve body is away from the corresponding valve seat. (opening/closing valve valve seat). On the contrary, when the solenoid valve valve body moves to the other side, the pressure control valve valve body is away from the pressure control valve valve seat and the opening/closing valve valve body approaches the opening/closing valve valve seat.

Further, the solenoid valve includes a spring that pushes up the solenoid valve valve body in a direction in which the pressure control valve valve body and the pressure control valve valve seat are away from each other and the opening/closing valve valve body is seated on the opening/closing valve valve seat, and a solenoid that applies to the solenoid valve valve body a thrust in a direction opposite to a direction of the force of the spring. When the solenoid valve is energized, the solenoid valve valve body is pushed down by the thrust of the solenoid against the biasing force of the spring to open the opening/closing valve valve body, and the valve opening pressure of the pressure control valve valve body is adjusted to be large or small depending on the energizing amount. On the other hand, when the solenoid valve is not energized, the biasing force of the spring pushes the solenoid valve valve body up to the maximum and closes the opening/closing valve valve body.

In this way, in the related art, the pressure control valve valve body for pressure control when energized and the opening/closing valve valve body that allows the liquid to flow to the second passage when not energized is integrated, and a single solenoid can perform both pressure control and passage opening and closing. However, when the second passage provided with the passive valve is connected between the pressure control valve valve body and the opening/closing valve valve body in the first passage as in the conventional case, the following problems may be pointed out.

In the conventional structure, when the flow rate of the first passage increases with the damping force characteristics softened by reducing the amount of current supplied to the solenoid valve, the pressure difference between the upstream side and the downstream side of the opening/closing valve valve body increases and the pressure between the opening/closing valve valve body and the pressure control valve valve body rises, so that the raised pressure may push up the solenoid valve valve body. When the solenoid valve valve body is pushed up in this way, the opening/closing valve valve body may close to be in a state of failure (failure state) despite the normal time, and even at the normal time, when the damping valve is in the failure state, the damping force characteristics shift to a characteristic at the time of failure.

Such a phenomenon naturally disappears when the flow rate decreases, and returns to a normal state, but until then, the back pressure of the main valve body is dominated by the passive valve, and the pressure control by the solenoid valve does not work. Therefore, the damping force cannot be adjusted until the normal state is restored.

Simply reconnecting the second passage upstream of the pressure control valve valve body in the first passage in order to solve the above problem requires setting the valve opening pressure of the passive valve higher than the upper limit pressure of the valve opening pressure of the pressure control valve valve body. This is because, in the above configuration, unless the valve opening pressure of the passive valve is set higher than the upper limit pressure of the valve opening pressure of the pressure control valve valve body, the adjustment range of the valve opening pressure of the pressure control valve valve body is narrowed and the damping force adjustment range at the normal time is narrowed. When the setting of the passive valve is limited in this way, the damping force characteristics at the time of failure cannot be freely set.

Occurrence of such a problem is not limited to when the solenoid valve pressure-controls the back pressure of the main valve body and when the valve device is used as the damping valve of the shock absorber. Therefore, the present invention is devised to solve such a problem, and an object of the present invention is to provide a valve device and a shock absorber that can prevent them from being in a failure state at the normal time and that can freely set a pas slue valve even when the solenoid valve performs both the pressure control and the passage opening/closing.

A valve device that solves the above problems includes a first passage and a second passage connected downstream of the pressure introducing passage, a solenoid valve that opens the first passage to control the upstream pressure and closes the second passage when energized, and closes the first passage and opens the second passage when not energized, and a passive valve provided downstream of the solenoid valve in the second passage.

DESCRIPTION OF EMBODIMENTS

Embodiments of the present invention will be described below with reference to the drawings. Like reference symbols in the several drawings indicate like parts.

Figure 1:
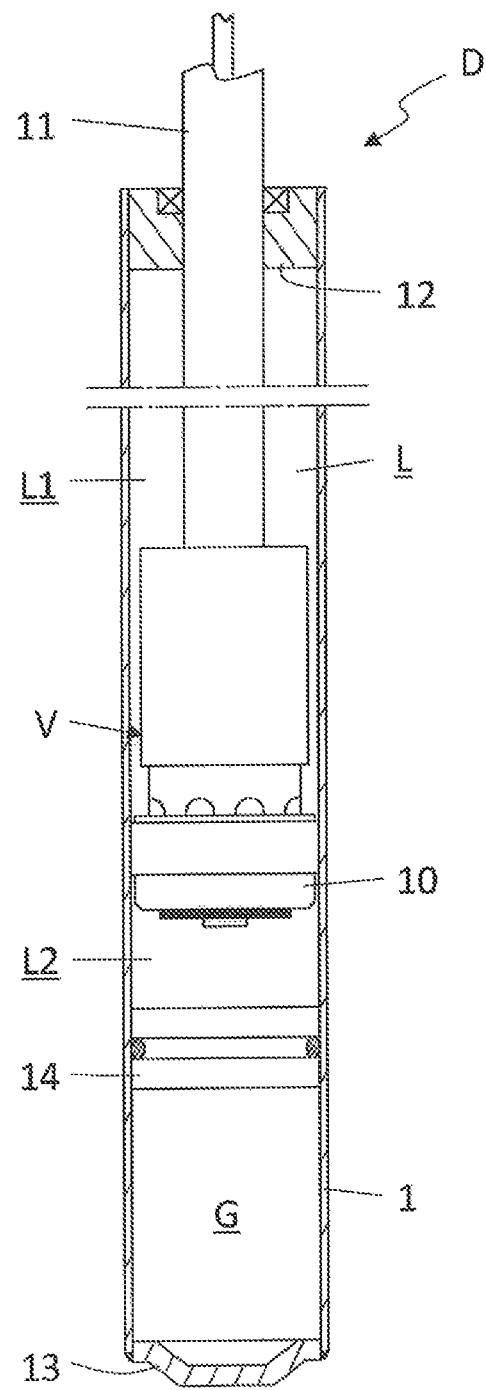
FIG. 1 is a longitudinal sectional view of a shock absorber including a damping valve that is a valve device according to an embodiment of the present invention.

As shown in FIG. 1, the valve device according to the embodiment of the present invention is used as a damping valve V of a shock absorber D. The shock absorber D is used for a vehicle suspension in the present embodiment, and includes a cylinder 1, a piston 10 slidably inserted into the cylinder 1, and a piston rod 11 having one end connected to the piston 10 and the other end protruding to the outside of the cylinder 1.

The cylinder 1 is connected to one of the vehicle body and the axle of the vehicle, and the piston rod 11 is connected to the other. In this way, the shock absorber D is interposed between the vehicle body and the axle. Further, when the vehicle vibrates up and down due to traveling on a bumpy road surface, the piston rod 11 moves in and out of the cylinder 1 to extend and contract the shock absorber D, and the piston 10 moves up and down (in the axial direction) in the cylinder 1 in FIG. 1.

An annular head member 12 into which the piston rod 11 is allowed to be inserted is attached to one end of the cylinder 1 in the axial direction. The head member 12 slidably supports the piston rod 11 and closes one end of the cylinder 1. On the other hand, the other end of the cylinder 1 is closed by a bottom cap 13. In this way, the cylinder 1 is hermetically sealed, and the cylinder 1 is filled with liquid and gas.

More specifically, a free piston 14 is slidably inserted into the cylinder 1 opposite to the piston rod 11 when viewed from the piston 10. Then, a liquid chamber L filled with a liquid such as hydraulic oil is formed on the piston 10 side of the free piston 14. On the other hand, a gas chamber G in which compressed gas is enclosed is formed opposite to the piston 10 as viewed from the free piston 14.

Thus, in the shock absorber D, the liquid chamber L and the gas chamber G in the cylinder 1 are partitioned by the free piston 14. Further, the liquid chamber L is partitioned by the piston 10 into an extension side chamber L1 on the piston rod 11 side and a compression side chamber L2 on the opposite side (opposite to the piston rod). The damping valve V is attached to the piston 10. Then, the damping valve V gives resistance to the flow of the liquid passing between the extension side chamber L1 and the compression side chamber L2.

According to the above configuration, when the shock absorber D extends, when the piston 10 moves in the cylinder 1 to the upper side in FIG. 1 and compresses the extension side chamber L1, the liquid in the extension side chamber L1 moves to the compression side chamber L2 through the damping valve V, and the damping valve V gives resistance to the flow of the liquid. Therefore, when the shock absorber D extends, the pressure of the extension side chamber L1 rises and the shock absorber D exerts an extension side damping force that hinders the extension operation.

On the contrary, when the piston 10 moves in the cylinder 1 to the lower side in FIG. 1 to compress the compression side chamber L2 when the shock absorber D contracts, the liquid in the compression side chamber L2 moves to the extension side chamber L1 through the damping valve V, and the damping valve V gives resistance to the flow of the liquid. Therefore, when the shock absorber D contracts, the pressure of the compression side chamber L2 rises and the shock absorber D exerts a compression side damping force that prevents the contraction operation.

Further, when the shock absorber D extends and contracts, the free piston 14 moves to expand and contract the gas chamber G to compensate for the volume of the piston rod 11 moving in and out of the cylinder 1.

However, the configuration of the shock absorber D is not limited to that shown in the drawing, and can be changed as appropriate. For example, instead of the gas chamber G, a reservoir that stores a liquid and a gas may be provided, and liquid may be exchanged between the cylinder and the reservoir when the shock absorber extends and contracts. Further, the shock absorber D may be a double rod type, and piston rods may be provided on both sides of the piston. In this case, a configuration for compensating the piston rod volume can be omitted.

Figure 2:
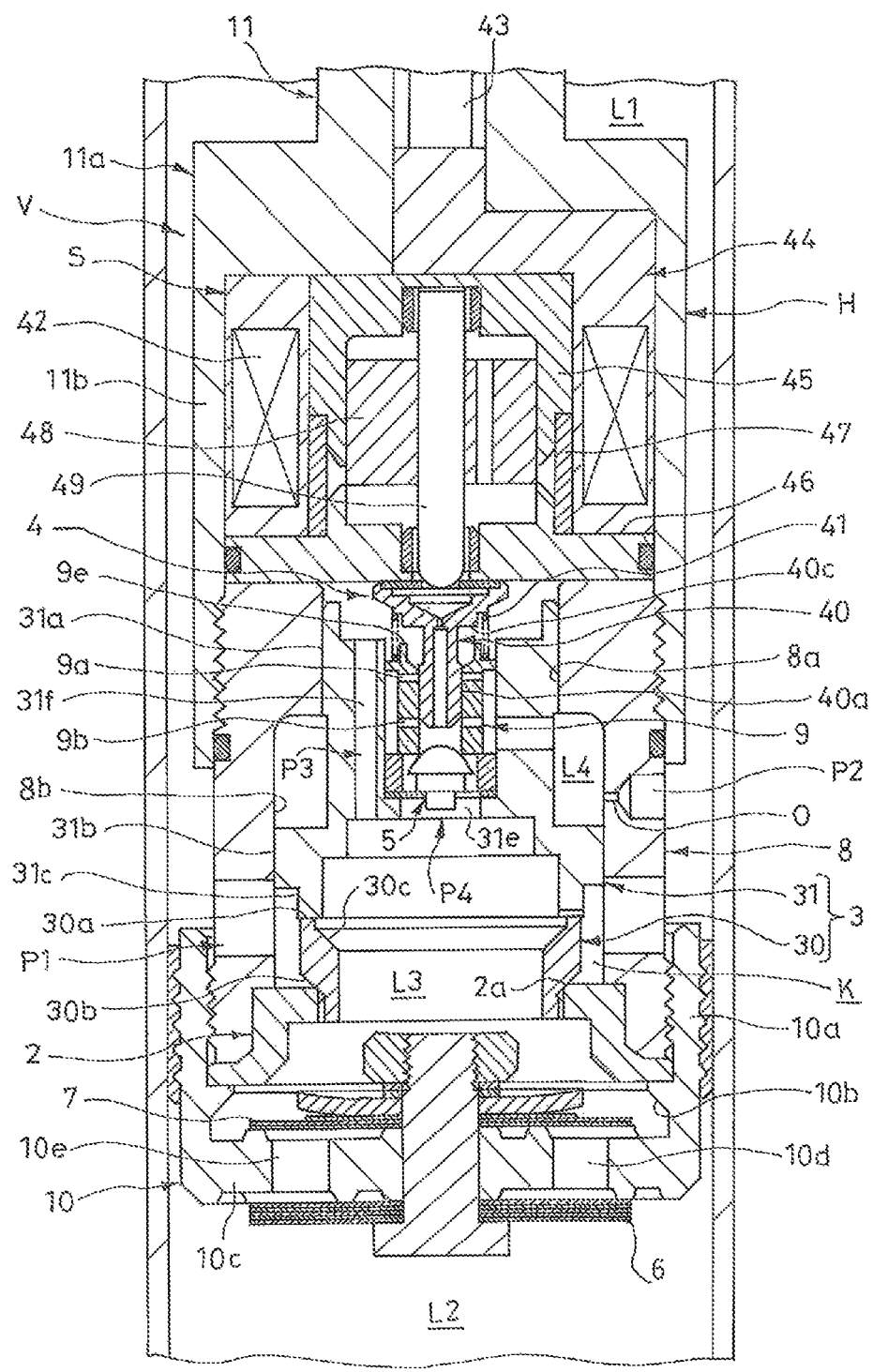
FIG. 2 is an enlarged longitudinal sectional view of the damping valve portion of FIG. 1.

Then, as shown in FIG. 2, the damping valve V includes a main passage P1 that connects the extension side chamber L1 and the compression side chamber L2, an annular valve seat member 2 at the inner periphery of which the main passage P1 is provided, a main valve body 3 that is seated on/separated from the valve seat member 2 to open and close the main passage P1, a pressure introducing passage P2, in the middle of which a throttle O is formed, for reducing the pressure of the extension side chamber L1 and guide the pressure to the back face of the main valve body 3, a first passage P3 and a second passage P4 connected downstream (opposite the extension side chamber) of the throttle O of the pressure introducing passage P2, a solenoid valve 4 that opens and closes the first passage P3 and the second passage P4, a passive valve 5 provided downstream of the solenoid valve 4 in the second passage P4, and an extension side valve 6 and a compression side valve 7 that open/close the compression side chamber L2 side relative to the main valve body 3 in the main passage P1.

Further, the piston 10 and the piston rod 11 together with a tubular guide 8 connecting them function as a housing H of the damping valve V. More specifically, the piston 10 has a bottomed tubular shape, and a tubular portion 10a is directed toward the piston rod 11. In addition, a ceiled tubular case portion 11a is provided at the tip of the piston rod 11, and the case portion 11a has a tubular portion 11b directed toward the piston 10. In this way, the piston 10 and the case portion 11a are disposed so that the tubular portions 10a and 11b thereof face each other.

One end portion of the guide 8 in the axial direction is screwed into the inner periphery of the tip portion of the tubular portion 11b in the case portion 11a, and the other end portion of the guide 8 in the axial direction is screwed into the inner periphery of the tip portion of the tubular portion 10a in the piston 10. In this way, the case portion 11a, the guide 8 and the piston 10 are integrated to function as the housing H of the damping valve V, and the valve seat member 2, the main valve body 3, the solenoid valve 4, the passive valve 5, and the compression side valve 7 are housed inside the housing H. Further, the extension side valve 6 is mounted outside of the housing H.

Figure 3:
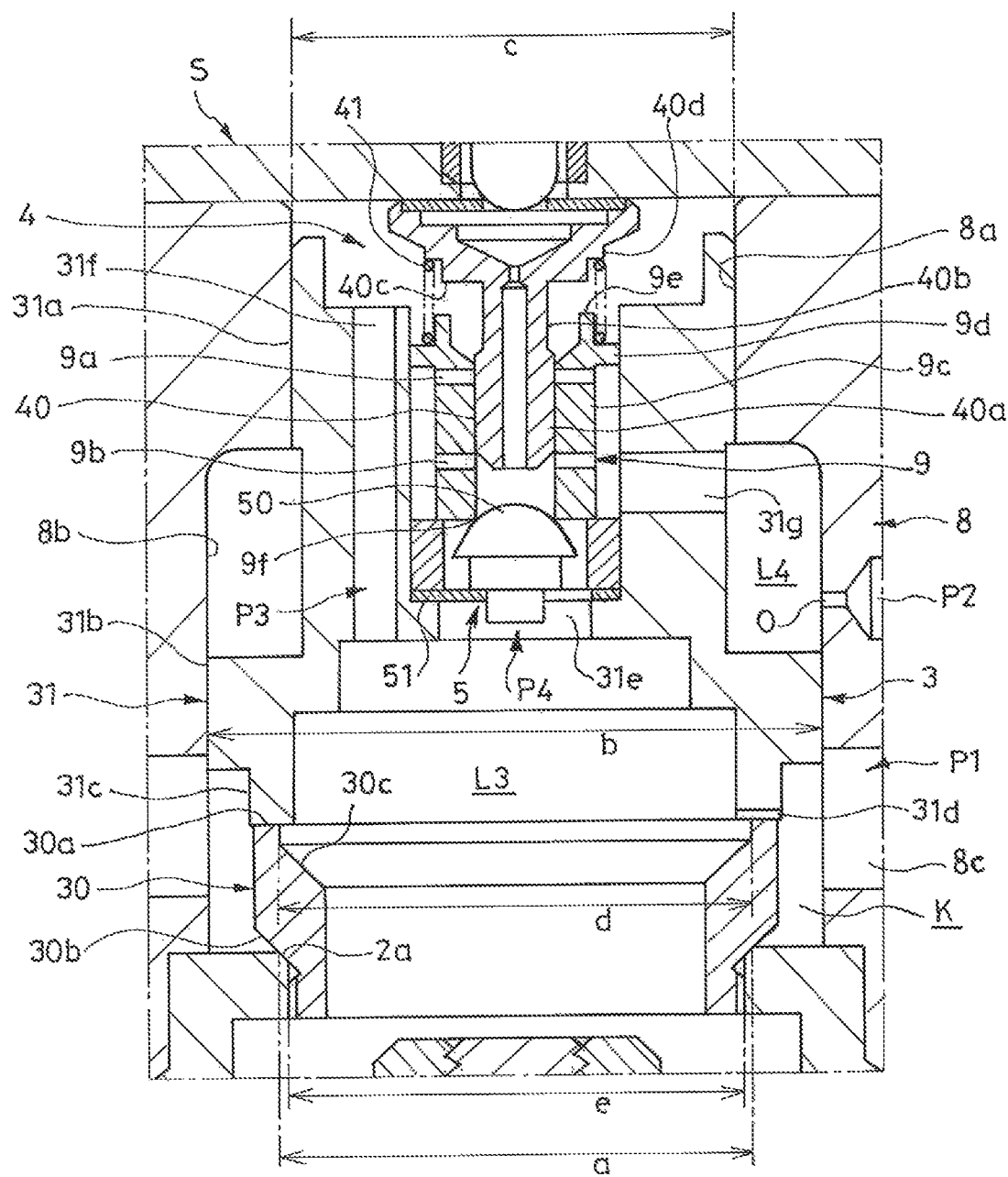
FIG. 3 is a longitudinal sectional view showing a part of FIG. 2 in a further enlarged manner.

Hereinafter, in the damping valve V, respective members housed in or mounted on the housing H will be described in detail. In the following description, for convenience of description, the upper and lower in FIGS. 2 and 3 are simply referred to as "upper" and "lower" unless otherwise specified.

A protrusion 10b is provided on the inner periphery of the tubular portion 10a of the piston 10. The outer peripheral portion of the valve seat member 2 is fixed by being sandwiched between the protrusion 10b and the guide 8. As described above, the valve seat member 2 is annular, and an annular first valve seat 2a is formed on the inner peripheral portion of the upper end thereof. Then, the main valve body 3 is seated on/separated from the first valve seat 2a. The main valve body 3 is divided into upper and lower parts, and includes a lower side (valve seat member 2 side) first valve body member 30 and an upper side second valve body member 31 stacked on the first valve body member 30.

The first valve body member 30 has an annular shape, and an annular second valve seat 30a where the second valve body member 31 is seated/separated is formed at the upper end thereof. Further, tapered faces 30b and 30c are formed on the outer periphery and the inner periphery of the first valve body member 30, respectively. Each of the tapered faces 30b and 30c has a truncated cone shape whose diameter gradually decreases toward the lower end. Then, the first valve body member 30 has a configuration in which the portion where the tapered face 30b is formed on the outer periphery is inserted inside of the valve seat member 2, and the tapered face 30b is seated on/separated from the first valve seat 2a.

On the other hand, the second valve body member 31 includes the head portion 31a, an annular flange portion 31b connected to the lower side of the head portion 31a and having an outer diameter larger than the outer diameter of the head portion 31a, and an annular leg portion 31c that projects downward from the inner peripheral portion of the lower end of the flange portion 31b and that is seated on/separated from the second valve seat 30a, and is slidably inserted inside the guide 8. More specifically, the lower side of the inner diameter of the guide 8 is larger than the upper side thereof. In the guide 8, when a portion with a small inner diameter is a small inner diameter portion 8a and a portion with a large inner diameter is a large inner diameter portion 8b, the head portion 31a of the second valve body member 31 slidably contacts the inner periphery of the small inner diameter portion 8a, and the flange portion 31b of the second valve body member 31 slidably contacts the inner periphery of the large inner diameter portion 8b.

Subsequently, as shown in FIG. 3, an annular gap K is formed on the outer periphery of the leg portion 31c of the second valve body member 31 and the first valve body member 30, and below the flange portion 31b. This annular gap K communicates with the extension side chamber L1 through a communication hole 8c formed in the guide 8, and the pressure in the annular gap K is substantially equal to the pressure of the extension side chamber L1. Then, the pressure of the extension side chamber L1 acts on the outer peripheral tapered face 30b of the main valve body 3, the lower side face of the flange portion 31b, etc., and the first valve body member 30 and the second valve body member 31 are biased upward by the pressure of the extension side chamber L1.

More specifically, the outer diameter of the contact portion of the tapered face 30b of the first valve body member 30 with the first valve seat 2a is a diameter a, and the outer diameter of the sliding contact portion of the flange portion 31b of the second valve body member 31 with the large inner diameter portion 8b is a diameter b. The diameter b is larger than the diameter a (b>a), and the pressure receiving area of the main valve body 3 that receives the pressure of the extension side chamber L1 is the area obtained by subtracting the area of the circle of the diameter a from the area of the circle of the diameter b. Then, the main valve body 3 is biased in a direction (opening direction) in which the first valve body member 30 is separated from the first valve seat 2a by the force obtained by multiplying the pressure of the extension side chamber L1 by its pressure receiving area.

For this reason, the pressure of the extension side chamber L1 increases when the shock absorber D extends, and when the first valve body member 30 and the second valve body member 31 are pushed up by the pressure and the first valve body member 30 is opened, the liquid in the extension side chamber L1 passes between the first valve body member 30 and the first valve seat 2a and moves toward the bottom portion 10c (FIG. 2) of the piston 10. The first valve body member 30 is designed to give resistance to the flow of the liquid.

As shown in FIG. 2, an extension side passage 10d and a compression side passage 10e which vertically penetrate the bottom portion 10c are formed at the bottom portion 10c of the piston 10. That is, when the inner peripheral side, between the head portion 31a of the second valve body member 31 and the bottom portion 10c of the piston 10, of the flange portion 31b, the leg portion 31c, the first valve body member 30, the valve seat member 2, and the tubular portion 10a of the piston 10 is a central chamber L3, the extension side passage 10d and the compression side passage 10e can communicate between the central chamber L3 and the compression side chamber L2.

The inlet of the extension side passage 10d communicates with the central chamber L3 at any time, and the outlet of the extension side passage 10d is opened/closed by the extension side valve 6 stacked below the bottom portion 10c. This extension side valve 6 opens when the shock absorber D extends to give resistance to the flow of a liquid flowing through the extension side passage 10d from the central chamber L3 to the compression side chamber L2, and closes during contraction to prevent the liquid from flowing in the opposite direction.

On the other hand, the inlet of the compression side passage 10e communicates with the compression side chamber L2 at any time, and the outlet of the compression side passage 10e is opened/closed by the compression side valve 7 stacked above the bottom portion 10c. The compression side valve 7 opens when the shock absorber D contracts to give resistance to the liquid flow from the compression side chamber L2 to the central chamber L3 through the compression side passage 10e, and is closed at the time of extension to prevent the liquid from flowing in the opposite direction. Then, the liquid that, has flowed into the central chamber L3 from the compression side chamber L2 when the shock absorber D contracts heads toward the main valve body 3.

The pressure of the central chamber L3 acts on the lower side face of the leg portion 31c of the second valve body member 31, etc., and the second valve body member 31 is biased upward by the pressure of the central chamber L3. Further, the pressure of the central chamber L3 acts on the inner peripheral side tapered face 30c of the first valve body member 30 and the like, and the first valve body member 30 is biased downward by the pressure of the central chamber L3. In this way, the first valve body member 30 and the second valve body member 31 are biased in opposite directions by the pressure of the central chamber L3.

More specifically, the upper and lower parts of the head portion 31a of the second valve body member 31 communicate with each other by a vertical hole 31f, which will be described later, and the pressures thereof are equal. Then, as shown in FIG. 3, the outer diameter of the sliding contact portion of the head portion 31a of the second valve body member 31 to the small inner diameter portion 8a is a diameter c, and the inner diameter of the contact portion of the leg portion 31c of the second valve body member 31 to the second valve seat 30a is a diameter d. Then, the diameter d is larger than the diameter c (d>c), and the pressure receiving area of the second valve body member 31 that receives the pressure of the central chamber 13 is the area obtained by subtracting the area of the circle of the diameter c from the area of the circle of the diameter d. Then, the second valve body member 31 is biased in a direction (opening direction) away from the second valve seat 30a by the force obtained by multiplying the pressure of the central chamber L3 by its pressure receiving area.

Further, when the inner diameter of the contact portion of the outer peripheral tapered face 30b of the first valve body member 30 to the first valve seat 2a is the diameter e, the aforementioned diameter d is larger than the diameter e (d>e), and the pressure receiving area of the first valve body member 30 that receives the pressure of the central chamber L3 is the area obtained by subtracting the area of the circle of diameter e from the area of the circle of diameter d. Then, the first valve body member 30 is biased in a direction (closing direction) in which it is seated on the first valve seat 2a by the force obtained by multiplying the pressure of the central chamber L3 by its pressure receiving area.

For this reason, when the shock absorber D contracts, the compression side valve 7 (FIG. 2) opens, the liquid flows from the compression side chamber L2 into the central chamber L3, and its pressure rises. When the second valve body member 31 is pushed up by this pressure and is away from the first valve body member 30, the liquid in the central chamber L3 passes through a space between the second valve body member 31 and the second valve seat 30a to move to the extension side chamber L1. Then, the second valve body member 31 gives resistance to the flow of the liquid.

As can be seen from the above, the communication hole 8c, the annular gap K, the central chamber L3, the extension side passage 10d and the compression side passage 10e are part of the main passage P1 that connects the extension side chamber L1 and the compression side chamber 12, and the main passage P1 is opened and closed by the main valve body 3. Furthermore, a passage toward the compression side chamber L2 relative to the opening/closing portion of the main valve body 3 in the main passage P1 branches into the extension side passage 10d and the compression side passage 10e, and the extension side valve 6 or the compression side valve 7 is provided in each of them (FIG. 2). In other words, the extension side valve 6 and the compression side valve 7 are connected in parallel toward the compression side chamber L2 of the main valve body 3.

Then, when the shock absorber D extends, the first valve body member 30 and the extension side valve 6 gives resistance to the flow of the liquid flowing through the main passage P1 from the extension side chamber L1 to the compression side chamber L2, and the shock absorber D exerts the extension side damping force caused by the resistance. On the contrary, when the shock absorber D contracts, the second valve body member 31 and the compression side valve 7 gives resistance to the flow of the liquid through the main passage P1 from the compression side chamber L2 to the extension side chamber L1, and the shock absorber D exerts the compression side damping force caused by the resistance.

Further, in the present embodiment, a notch 31d (FIG. 3) is formed at the lower end of the leg portion 31c of the second valve body member 31. An orifice is formed by the notch 31d. Therefore, even when the main valve body 3 is closed, that is, even when both the first valve body member 30 and the second valve body member 31 are closed, the extension side chamber L1 and the central chamber L3 communicate with each other through the orifice.

Next, an annular back pressure chamber L4 is formed between the head portion 31a of the second valve body member 31 and the large inner diameter portion 8b of the guide 8, and above the flange portion 31b. The back pressure chamber L4 and the extension side chamber L1 communicate with each other by the pressure introducing passage P2 formed in the guide 8. The throttle O is provided in the pressure introducing passage P2, so that the pressure of the extension side chamber L1 is reduced and guided to the back pressure chamber L4.

The pressure of the back pressure chamber L4 rises when the shock absorber D extends, in which the pressure of the extension side chamber L1 increases to act on the upper side face of the flange portion 31b which is the back face of the main valve body 3, and the first valve body member 30 and the second valve body member 31 are biased downward by the pressure of the back pressure chamber L4. More specifically, the pressure receiving area of the main valve body 3 that receives the pressure of the back pressure chamber L4 is an area obtained by subtracting the area of the circle of diameter c (FIG. 3) from the area of the circle of diameter b (FIG. 3) described above. Then, the main valve body 3 is biased in a direction (closing direction) in which the first valve body member 30 and the second valve body member 31 are seated on the first valve seat 2a and the second valve seat 30a, respectively, by a force obtained by multiplying the pressure of the back pressure chamber L4 by the pressure receiving area thereof.

Also, as shown in FIG. 3, a mounting hole 31e that vertically penetrates the center of the head portion 31a, the vertical hole 31f which is formed at the outer peripheral of the mounting hole 31e and which communicate between the top and bottom of the head portion 31a, and a lateral hole 31g having one end that is open to the back pressure chamber L4 and the other end that is open to the mounting hole 31e is formed at the head portion 31a of the second valve body member 31. Further, a valve case 9 including a first port 9a and a second port 9b is mounted in the mounting hole 31e. Then, the first port 9a and the second port 9b are opened and closed by the solenoid valve 4.

More specifically, the valve case 9 includes a tubular guide portion 9c disposed with one end in the axial direction upward, an annular collar portion 9d that projects radially outward from the upper end of the guide portion 9c, and an annular pressure control valve valve seat 9e protruding upward from the upper end of the collar portion 9d. As described above, the valve case 9 has a substantially tubular shape as a whole.

The above-mentioned first port 9a and second port 9b are formed at positions vertically (axially) displaced from the guide portion 9c so as to penetrate the wall thickness of the guide portion 9c. The first port 9a is located above the second port 9b (toward the pressure control valve valve seat 9e). In addition, the outer diameter of the guide portion 9c is smaller than the diameter of the mounting hole 31e, and an annular gap that is closed at the top and bottom is formed at the outer periphery of the guide portion 9c. Then, the lateral hole 31g is opened in the annular gap. Therefore, the liquid in the back pressure chamber L4 can flow into the inner peripheral side of the guide portion 9c through the lateral hole 31g, and the first port 9a or the second port 9b.

Subsequently, the solenoid valve 4 includes a solenoid valve valve body 40 that opens and closes the first port 9a and the second port 9b and that is seated on/separated from the pressure control valve valve seat 9e. The solenoid valve valve body 40 includes an opening/closing valve valve body 40a that is slidably inserted into the guide portion 9c of the valve case 9 to open one of the first port 9a and the second port 9b and close the other, a shaft portion 40b that projects above the valve case 9 from the opening/closing valve valve body 40a, and that has an outer diameter smaller than the outer diameter of the opening/closing valve valve body 40a, a pressure control valve valve body 40c that laterally overhangs from the upper end of the shaft portion 40b that protrudes outside of the valve case 9 and that is seated on/separated from the pressure control valve valve seat 9e, and a spring receiving portion 40d that further extends laterally from the pressure control valve valve body 40c.

Further, the solenoid valve 4 includes a spring 41 that biases the solenoid valve valve body 40 upward, that is, in a direction in which the pressure control valve valve body 40c is separated from the pressure control valve valve seat 9e. The spring 41 may be any spring, but is a coil spring in the present embodiment. The upper end of the spring 41 is supported by the spring receiving portion 40d of the solenoid valve valve body 40. On the other hand, the lower end of the spring 41 is supported by the outer periphery of the collar portion 9d of the valve case 9 relative to the pressure control valve valve seat 9e. In this way, the spring 41 is interposed between the solenoid valve valve body 40 and the valve case 9.

Further, the solenoid valve 4 has a solenoid S that applies the thrust to the solenoid valve valve body 40 downward, that is, in a direction in which the pressure control valve valve body 40c seated on the pressure control valve valve seat 9e. As shown in FIG. 2, this solenoid S is housed in the case portion 11a of the piston rod 11, and includes a molded stator 44 in which winding 42 and a harness 43 for energizing the winding 42 are integrated with a molding resin, a celled tubular first fixed iron core 45 fitted to the inner periphery of the molded stator 44, an annular second fixed iron core 46 stacked on the lower end of the molded stator 44, a filler ring 47 that is interposed between the first fixed iron core 45 and the second fixed iron core 46 and that forms a magnetic gap between them, a tubular movable iron core 48 disposed axially movably at the inner periphery of the first fixed iron core 45 and the second fixed iron core 46, and a shaft 49 that is fixed to the inner periphery of the movable iron core 48, and that has a tip that contacts the solenoid valve valve body 40.

When the winding 42 is excited, the magnetic path is formed so as to pass through the first fixed iron core 45, the movable iron core 48, the second fixed iron core 46, and the case portion 11a, and the movable iron core 48 is attracted toward the second fixed iron core 46 side. When the movable iron core 48 is thus attracted, the solenoid valve valve body 40 is pushed downward by the shaft 49. That is, when energized, the solenoid S applies a thrust in a direction opposite to a direction of the biasing force of the spring 41 to the solenoid valve valve body 40.

When the solenoid valve valve body 40 receives such thrust from the solenoid S, the solenoid valve valve body 40 moves downward while compressing the spring 41, and the opening/closing valve valve body 40a moves below the first port 9a to open the first port 9a and close the second port 9b. Further, in the state where the first port 9a is opened by the opening/closing valve valve body 40a, the pressure control valve valve body 40c is seated on or approaches the pressure control valve valve seat 9e, the pressure of the back pressure chamber L4 acts on the lower face of the pressure control valve valve body 40c through the first port 9a, and the solenoid valve valve body 40 is biased upward.

For this reason, when the solenoid S is energized, when the resultant force of the force by the pressure of the back pressure chamber L4 that biases the solenoid valve valve body 40 upward and the biasing force of the spring 41 exceeds the thrust of the solenoid S that biases the solenoid valve valve body 40 downward, the pressure control valve valve body 40c is away from the pressure control valve valve seat 9e. When the pressure control valve valve body 40c opens in this way, the liquid passes through a space between the pressure control valve valve body 40c and the pressure control valve valve seat 9e to move above the head portion 31a, and moves from above the head portion 31a to the central chamber L3 through the vertical hole 31f. The valve opening pressure of the pressure control valve valve body 40c is proportional to the amount of current supplied to the solenoid S, and the larger the amount of supply current is, the greater the valve opening pressure of the pressure control valve valve body 10c is.

On the other hand, when the solenoid. S is de-energized, the solenoid valve valve body 40 is pushed up to the maximum by the biasing force of the spring 41. Then, the opening/closing valve valve body 40*a* moves above the second port 9*b* to open the second port 9*b* and close the first port 9*a*. FIGS. 2 and 3 show the state of the solenoid valve valve body 40 when not energized.

The passive valve 5 is mounted below the valve case 9 in the mounting hole 31*e*. As shown in FIG. 3, this passive valve 5 includes a passive valve valve body 50 that is seated on/separated from an annular passive valve valve seat 9*f* provided at the lower end of the guide portion 9*c* in the valve case 9 and that opens and closes the lower end of the guide portion 9*c*, and a biasing spring 51 that biases the passive valve valve body 50 in a direction (closing direction) in which the passive valve valve body 50 is seated on the passive valve valve seat 9*f*.

When the solenoid S is not energized where the second port 9*b* is opened by the opening/closing valve valve body 40*a*, the pressure of the back pressure chamber L4 acts on the upper face of the passive valve valve body 50 through the second port 9*b*, and the passive valve valve body 50 is biased downward, that is, in a direction in which the passive valve valve body 50 is separated from the passive valve valve seat 9*f*. For this reason, when the solenoid S is not energized, the liquid in the back pressure chamber L4 flows below the opening/closing valve valve body 40*a* from the second port 9*b*, and when the passive valve valve body 50 is pushed open against the biasing force of the biasing spring 51, the liquid moves to the central chamber L3 through a space between the passive valve valve body 50 and the passive valve valve seat 9*f*.

As can be seen from the above, the first port 9*a*, the upper side of the head portion 31*a*, and the vertical hole 31*f* are part of the first passage P3 connected downstream of the pressure introducing passage P2. When the solenoid S is energized, the opening closing valve valve body 40*a* opens the first port 9*a* to communicate between the first passage P3 and the back pressure chamber L4, and the valve opening pressure of the pressure control valve valve body 40*c* is controlled. For this reason, when the solenoid valve 4 is energized while the shock absorber P extends in which the pressure of the back pressure chamber L4 increases, the pressure of the back pressure chamber L4 is controlled to the valve opening pressure of the pressure control valve valve body 40*c*.

On the other hand, the second port 9*b* and the lower side of the valve case 9 in the mounting hole 31*e* is a part of the second passage P4 connected downstream of the pressure introducing passage P2. When the solenoid S is not energized, the opening/closing valve valve body 40*a* opens the second port 9*b* to communicate between the second passage P4 and the back pressure chamber L4. The passive valve 5 is provided in the second passage P4. For this reason, when the solenoid valve 4 is de-energized, in a case where the shock absorber D extends in which the pressure of the back pressure chamber L4 increases, the pressure of the back pressure chamber L4 is the valve opening pressure of the passive valve 5.

As described above, the pressure of the back pressure chamber L4 acts in the direction of closing the main valve body 3. In addition, when the solenoid valve 4 is energized, the thrust of the solenoid S also acts in the direction of closing the main valve body 3 via the solenoid valve valve body 40 and the valve case 9. For this reason, in a case where the shock absorber D extends at the normal time when the solenoid valve 4 is energized, the first valve body member 30 opens when the force, due to the pressure of the extension side chamber L1, that biases the first valve body member 30 of the main valve body 3 in the opening direction exceeds the resultant force of the force, due to the pressure of the back pressure chamber L4 that biases the main valve body 3 in the closing direction, and the thrust of the solenoid S.

In a case where the shock absorber D extends at the normal time, when the thrust of the solenoid a as adjusted and the pressure of the back pressure chamber L4 is controlled by the solenoid valve 4, the force that biases the main valve body 3 in the closing direction is adjusted, and the resistance, due to the first valve body member 30, given to the flow of the liquid flowing from the extension side chamber L1 to the central chamber L3 through the main passage P1 is changed. Therefore, at the normal time, the damping force when the shock absorber D extends (the extension side damping force) can be adjusted.

Specifically, when the amount of current supplied to the solenoid valve 4 is increased, the thrust of the solenoid S increases and the pressure of the back pressure chamber L4 increases at the time of extension, and the force that biases the main valve body 3 in the closing direction becomes large, so that it is possible to increase the extension side damping force to harden the damping force characteristics. On the contrary, when the amount of current supplied to the solenoid valve 4 is reduced, the thrust of the solenoid S decreases and the pressure of the back pressure chamber L4 decreases at the time of extension, and the force that biases the main valve body 3 in the closing direction becomes small, so that it is possible to reduce the extension side damping force to soften the damping force characteristics.

On the other hand, when the shock absorber D extends at the time of failure to cut off the power supply to the solenoid valve 4, the pressure of the back pressure chamber L4 is the valve opening pressure of the passive valve 5. Therefore, the extension side damping force at the time of failure is determined by setting the passive valve 5. Further, since the communication between the second passage P4 provided with the passive valve 5 and the back pressure chamber L4 is blocked at the normal time, there is no occurrence that the damping force characteristics of the shock absorber D are the characteristics at the tame of the failure despite the normal time.

When the shock absorber D contracts in which the pressure of the back pressure chamber L4 does not rise, the pressure control valve valve body 40*c* does not open even when the first port 9*a* is open, and the pressure control of the back pressure chamber L4 by the solenoid valve 4 does not work. However, when energized, the thrust of the solenoid S acts in the direction of closing the main valve body 3 via the solenoid valve valve body 40 and the valve case 9. For this reason, when the thrust of solenoid S is adjusted, the resistance, due to the second valve body member 31, given to the flow of the liquid flowing from the central chamber L3 to the extension side chamber L1 through the main passage P1 is changed, so that the damping force when the shock absorber D contracts (the compression side damping force) can be adjusted at the normal time.

Specifically, when the amount of current supplied to the solenoid valve 4 is increased, the thrust of the solenoid S increases, and the force that biases the main valve body 3 in the closing direction becomes large, even when contracted, so that it is possible to increase the compression side damping force to harden the damping force characteristics. On the contrary, when the amount of current supplied to the solenoid valve 4 is reduced, the thrust of solenoid S becomes small, and the force that biases the main valve body 3 in the closing direction becomes small, even when contracted, so that it is possible to reduce the compression side damping force to soften the damping force characteristics.

On the other hand, when the solenoid S is not energized, the solenoid valve valve body 40 receives the biasing force of the spring 41 and retracts to the maximum extent. At this time, the main valve body 3 together with the valve case 9 is only biased in the closing direction by the spring 41. Therefore, the compression side damping force of the shock absorber D is the smallest at the time of failure, and the damping force characteristics are fully softened.

Hereinafter, the function and effect of the damping valve V that is the valve device according to the present embodiment will be described.

In the present embodiment, the damping valve (valve device) V includes a pressure introducing passage P2, a first passage P3 and a second passage P4 connected downstream of the pressure introducing passage P2, a solenoid valve 4 that opens the first passage P3 to control an upstream pressure and closes the second passage P4 when energized, and that closes the first passage P3 and opens the second passage P4 when not energized, and a passive valve 5 provided downstream of the solenoid valve 4 in the second passage P4.

According to the above configuration, even when the solenoid valve 4 performs both pressure control and passage opening/closing, the upstream of the passive valve 5 is closed by the solenoid valve 4 when energized, so that it is possible to prevent the damping valve (valve device) V from being in a failure state at the normal time.

Furthermore, since the passage through which the liquid from the pressure introducing passage P2 can pass is switched between when the solenoid valve 4 is energized and when it is not energized, the characteristics of the passive valve 5 can be set freely.

Figure 4:
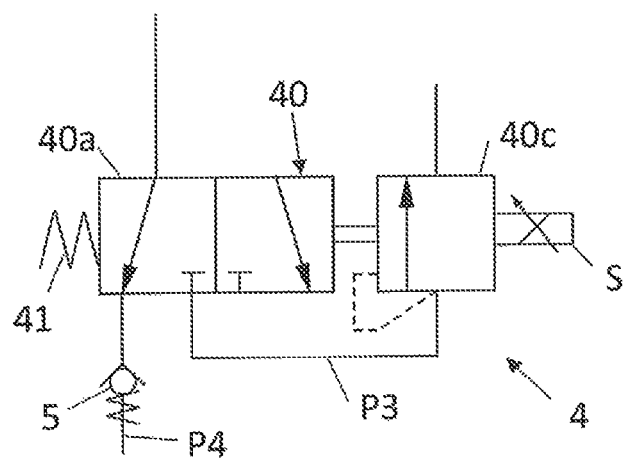
FIG. 4 is a circuit diagram of a solenoid valve portion of a damping valve that is a valve device according to the embodiment of the present invention.

Further, as shown in FIG. 4, in the damping valve (valve device) V of the present embodiment, the solenoid valve valve body 40 which is the valve body of the solenoid valve 4 includes the opening/closing valve valve body 40a that opens and closes the first passage P3 and the second passage P4, and a pressure control valve valve body 40c that opens and closes a downstream side relative to the opening/closing valve valve body 40a in the first passage P3. When the solenoid valve 4 is energized, the opening/closing valve valve body 40a opens the first passage P3 and closes the second passage P4, and a valve opening pressure of the pressure control valve valve body 40c is controlled.

According to the solenoid valve 4, the upstream pressure can be controlled to the valve opening pressure of the pressure control valve valve body 40c when energized. In the solenoid valve 4, the opening/closing valve valve body 40a of the solenoid valve valve body 40 opens and closes the upstream side relative to the pressure control valve valve body 40c. That is, the present invention does not have a configuration in which the opening/closing valve valve body opens and closes the downstream side relative to the pressure control valve valve body as in the prior art. For this reason, the opening/closing valve valve body 40a and the pressure control valve valve body 40c are integrated and driven by a single solenoid S, and even when the solenoid valve 4 performs both pressure control and passage opening/closing, it is possible to prevent the damping valve (valve device) V from being in a failure state at the normal time.

Further, when de-energized in which the passive valve 5 works, the first passage P3 is closed by the opening/closing valve valve body 40a and the pressure control valve valve body 40c does not operate, and when energized in which the pressure control valve valve body 40c operates, the second passage P4 is closed and the passive valve 5 does not work. For this reason, the opening/closing valve valve body 40a and the pressure control valve valve body 40c are integrated and driven by a single solenoid 5, even when the solenoid valve 4 performs both pressure control and passage opening/closing, it is not necessary to set the passive valve 5 in consideration of the valve opening pressure of the pressure control valve valve body 40c, so that the characteristics of the passive valve 5 can be set freely.

Further, in the present embodiment, the valve device according to the present invention is used as the damping valve V of the shock absorber D, and gives resistance to the liquid flow generated when the piston 10 moves in the cylinder 1. Therefore, the shock absorber D can exert a damping force due to the resistance of the damping valve V.

When the valve opening pressure of the pressure control valve valve body 40c is increased or decreased when the solenoid valve 4 is energized, the damping force can be increased or decreased. For this reason, as described above, when the damping valve (valve device) V is prevented from being in a failure state at the normal time, it is possible to suppress the occurrence that the damping force characteristics are the characteristics at the time of failure despite the normal time and the damping force cannot be adjusted. Further, the damping force characteristics at the time of failure are determined setting the passive valve 5. Therefore, as described above, when the passive valve 5 can be freely set, the damping force characteristics at the time of failure can be freely set.

Further, the damping valve (valve device) V of the present embodiment includes the tubular valve case 9 into which the opening/closing valve valve body 40a is slidably inserted at the inner periphery. Then, the first port 9a serving as an opening/closing portion of the opening/closing valve valve body 40a in the first passage P3, and the second port 9b serving as the opening/closing portion of the opening/closing valve valve body 40a in the second passage P4 are formed at positions shifted in the axial direction of the valve case 9.

Further, the pressure control valve valve seat 9e which the pressure control valve valve body 40c is seated on/separated from is provided at an end of the valve case 9 toward the first port 9a. The solenoid valve 4 includes the spring 41 that biases the solenoid valve valve body 40 in a direction in which the pressure control valve valve body 40c and the pressure control valve valve seat 9e are away from each other, and the solenoid S that applies, to the solenoid valve valve body 40, a thrust in a direction opposite to a direction of a biasing force of the spring 41.

According to the above configuration, it is easy to open the first passage P3 and close the second passage P4 by the opening/closing valve valve body 40a when the solenoid valve 4 is energized, and control the valve opening pressure of the pressure control valve valve body 40c. Further, according to the above configuration, it is easy to open the second passage 84 while closing the first passage P3 by the opening/closing valve valve body 40a when the solenoid valve 4 is not energized.

However, the configuration of the solenoid valve 4 is not limited to the above. As long as the first passage P3 is opened to control the upstream pressure and the second passage P4 it closed when energized, and the first passage P3 is closed and the second passage P4 is opened when not energized, the configuration may be changed appropriately.

Further, in the present embodiment, the passive valve valve seat 9f is provided at the end of the valve case 9 toward the second port 9h. Further, the passive valve 5 includes the passive valve valve body 50 that is seated on/separated from the passive valve valve seat 9f, and the biasing spring 51 that biases the passive valve valve body 50 toward the passive valve valve seat 9f.

According to the above configuration, since the valve case 9 and the passive valve valve seat 9f can be integrated, when these are integrally molded as one component, the number of components of the damping valve (valve device) V can be reduced and the cost can be reduced. Furthermore, since the valve case 9 and the passive valve 5 can be installed compactly, when the valve case 9 and the passive valve 5 are mounted on the main valve body 3 as in the damping valve V of the present embodiment, the main valve body 3 is not bulky, and thus the damping valve (valve device) V can be downsized.

However, the passive valve valve seat 9f may be provided separately from the valve case 9. Furthermore, although the biasing spring 51 is a leaf spring in the present embodiment, it may be a coil spring or another spring. Then, these changes are possible regardless of the configuration of the solenoid valve 4.

Further, the damping valve (valve device) V of the present embodiment includes the main passage P1 that communicates between the extension side chamber L1 and the compression side chamber L2, the annular valve seat member 2 at the inner periphery of which the main passage P1 is provided, and the main valve body 3 that is seated on/separated from the valve seat member 2 to give resistance to a flow of a liquid passing through the main passage P1. The pressure introducing passage P2 is configured to reduce a pressure of the extension side chamber L1 and guide the reduced pressure to a back face of the main valve body 3 as a back pressure.

Further, the main valve body 3 includes the annular first valve body member 30 that is seated on/separated from the valve seat member 2, and the second valve body member 31 that is stacked on the first valve body member 30 opposite to the valve seat member, and that is seated on/separated from the first valve body member 30, in which the valve case 9 and the passive valve 5 are attached to the second valve body member 31. The first valve body member 30 and the second valve body member 31 are biased in a direction away from the valve seat member 2 by a pressure of the extension side chamber L1. On the other hand, the second valve body member 31 is biased in a direction away from the first valve body member 30 by a pressure at an inner periphery of the first valve body member 30.

According to the above configuration, in a case where the shock absorber D extends and the pressure of the extension side chamber L1 increases when the solenoid valve 4 is energized, the back pressure of the main valve body 3 can be controlled to the valve opening pressure of the pressure control valve valve body 40c, and the back pressure and the thrust of the solenoid S is controlled, so that the resistance, of the first valve body member 30, given to the flow of the liquid flowing from the extension side chamber L1 to the compression side chamber L2 in the main passage P1 can be changed.

Also, in a case where the shock absorber D contracts and the pressure of the compression side chamber L2 increases when the solenoid valve 4 is energized, the resistance, of the second valve body member 31, given to the flow of the liquid flowing from the compression side chamber L2 to the extension side chamber L1 in the main passage P1 can be changed by controlling the thrust force of the solenoid S.

On the other hand, in a case where the shock absorber D extends and the pressure of the extension side chamber L1 increases when the solenoid valve 4 is not energized, since the back pressure of the main valve body 3 is determined by setting the passive valve 5, the resistance of the first valve body member 30 can be determined by setting the passive valve 5. In a case where the shock absorber D contracts and the pressure of the compression side chamber L2 increases when the solenoid valve 4 is not energized, the resistance of the second valve body member 31 can be determined by setting the spring 41.

In the present embodiment, the one chamber and the other chamber, which communicate with each other through the main passage P1, are the extension side chamber L1 and the compression side chamber L2 of the shock absorber D, respectively. However, the chamber communicating through the main passage P1 is not necessarily limited to the extension side chamber L1 and the compression side chamber L2. For example, as described above, when the shock absorber includes the reservoir, the main passage P1 may be a passage that communicates between the extension side chamber or the compression side chamber, and the reservoir.

Furthermore, in the present embodiment, the pressure of the extension side chamber L1 is guided to the back pressure chamber L4 through the pressure introducing passage P2, and when the shock absorber D extends at the normal time, the back pressure of the main valve body 3 is controlled to the valve opening pressure of the pressure control valve valve body 40c. However, the pressure of the main passage P1 upstream of the main valve body 3 may be introduced to the back pressure chamber L4 both when the shock absorber D extends and when the shock absorber D contracts.

Figure 5:
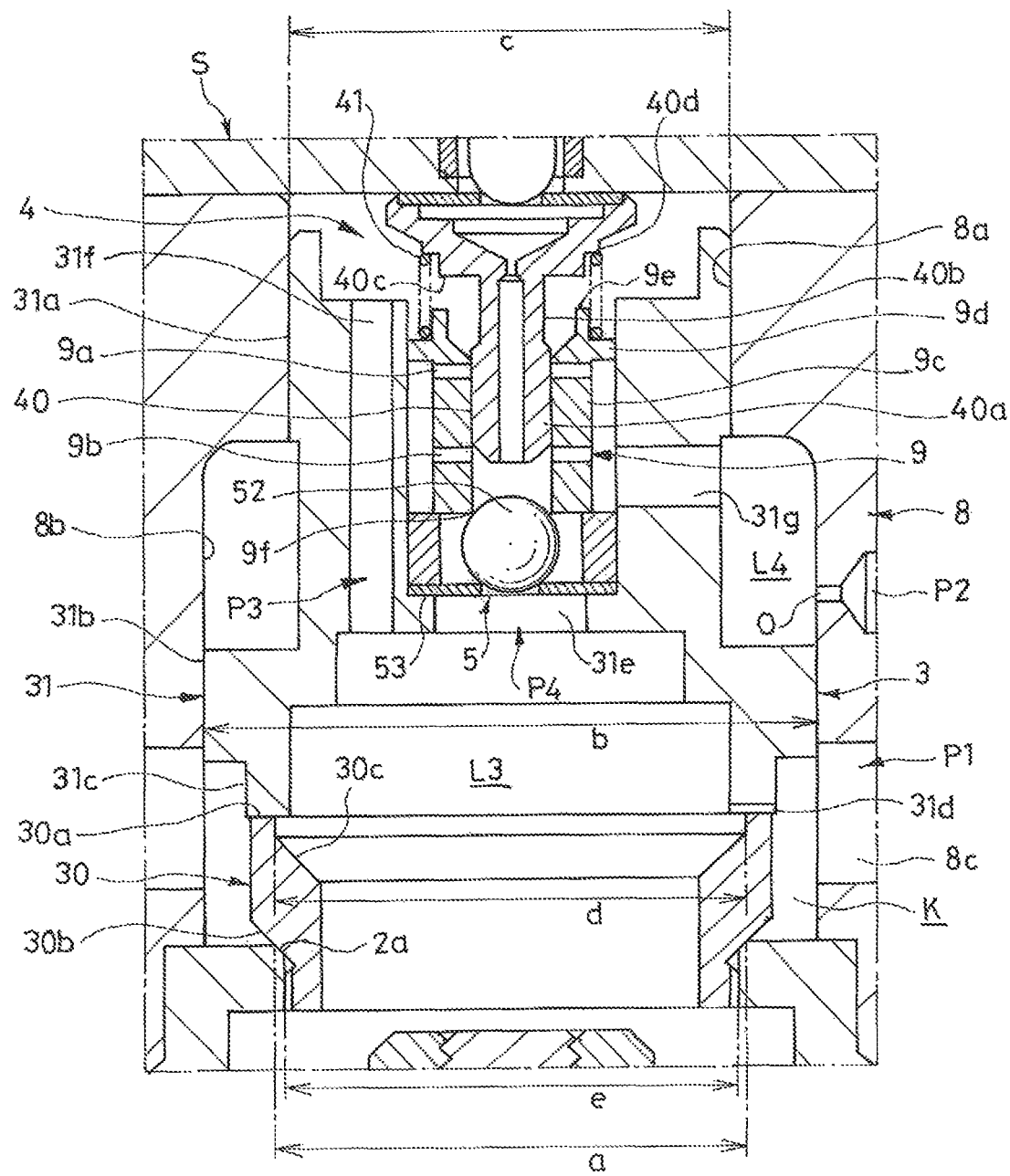
FIG. 5 is an enlarged longitudinal sectional view of a damping valve that is a valve device according to a first modification of the embodiment of the present invention.

Further, in the present embodiment, the passive valve valve body 50 has a mushroom shape, but may have a spherical shape. When the shape of the passive valve valve body 50 is spherical, specifically, it may be configured as shown in FIG. 5, for example.

The passive valve 5 includes a spherical passive valve valve body 52 that is seated on/separated from an annular passive valve valve seat 9f provided at the lower end of the guide portion 9c in the valve case 9 and that opens and closes the lower end of the guide portion 9c, and a leaf spring 53 serving as a biasing spring that biases the passive valve valve body 52 in a direction (closing direction) in which the passive valve valve body 52 is seated on the passive valve valve seat 9f.

Figure 6:
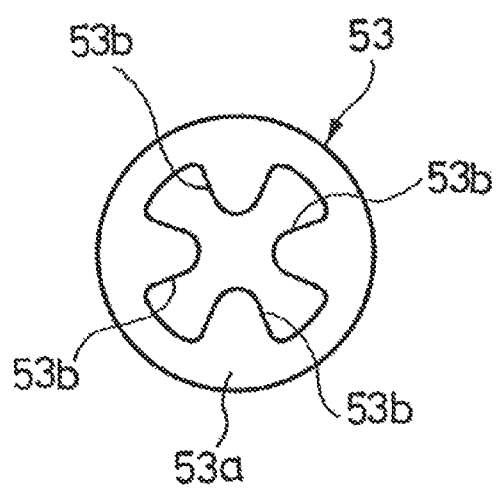
FIG. 6 is an enlarged plan view of a leaf spring of a passive valve in the damping valve that is the valve device according to the first modification of the embodiment of the present invention.

As shown in FIG. 6, the leaf spring 53 has an annular mounting portion 53a and a plurality of support portions 53b protruding from the mounting portion 53a toward the center. These support portions 53b are disposed at equal intervals in the circumferential direction of the mounting portion 53a. In the leaf spring 53, the mounting portion 53a is fixed to the second valve body member 31, and the tip of the support portion 53b supports the lower side of the passive valve valve body 52.

When the solenoid S is not energized where the second port 9b is opened by the opening/closing valve valve body 40a, the pressure of the back pressure chamber L4 acts on the upper face of the passive valve valve body 52 through the second port 9b, and the passive valve valve body 52 is biased downward, that is, in a direction in which the passive valve valve body 52 is separated from the passive valve valve seat 9f. For this reason, when the solenoid S is not energized, the liquid in the back pressure chamber L4 flows into the lower side of the opening/closing valve valve body 40a from the second port 9b, and when the passive valve valve body 52 is pushed down against the biasing force of the leaf spring 53, the liquid moves to the central chamber L3 through a space between the passive valve valve body 52 and the passive valve valve seat 9f and a space between the adjacent support portions 53b and 53b.

In this way, when the passive valve 5 includes the spherical passive valve valve body 52 which is seated on/separated from the annular passive valve valve seat 9f to open and close the second passage 94, and the leaf spring 53 that biases the passive valve valve body 52 in the closing direction, since the passive valve valve body 52 has a spherical shape, the passive valve valve body 52 and the passive valve valve seat 9f can be in line contact with each other. Therefore, the adsorption of the passive valve valve body 52 can be suppressed. Furthermore, the leaf spring 53 can freely change the plate thickness, the number of the support portions 53b, the length, the circumferential width, and the like. In this way, the shape of the leaf spring 53 can be freely changed, so that the characteristics of the passive valve 5 can be set finely. In addition, since the passive valve valve body 52 has a spherical shape, for example, when the passive valve valve body 52 is dropped onto the passive valve valve seat 9f, it is naturally aligned. Therefore, according to the above configuration, the passive valve 5 can be easily assembled. Further, since the passive valve valve body 52 and the passive valve valve seat 9f make a line contact to suppress the adsorption of the passive valve valve body 52, when the pressure of the back pressure chamber L4 reaches the valve opening pressure of the passive valve 5, the passive valve 5 opens promptly. Therefore, the pressure of the back pressure chamber L4 does not overshoot the valve opening pressure of the passive valve 5 and does not suddenly change with the opening of the passive valve 5, there is no occurrence that sudden changes in the damping force of the shock absorber D give vibrations to the vehicle body and cause abnormal noise, and deteriorate the comfort of riding the vehicle. In this way, when the passive valve 5 includes the spherical passive valve valve body 52 which is seated on/separated from the annular passive valve valve seat 9f to open and close the second passage P4, and the leaf spring 53 that biases the passive valve valve body 52 in the closing direction, sudden changes in damping force at the time of failure can be suppressed, and when the shock absorber D is interposed between the vehicle body and the axle, the comfort of riding the vehicle can be improved.

As aforementioned, when the passive valve valve body 52 is made spherical and is biased by the leaf spring 53, it is possible to suppress sudden changes in the damping force at the time of failure and improve the comfort of riding the vehicle. The passive valve 5 may have any structure as long as it has a pressure flow rate characteristic in which the pressure loss is uniquely determined with respect to the passing flow rate, and the structure is not limited to that shown in the drawings. Therefore, the shape of the passive valve valve body 50 may be a plate shape other than the mushroom shape shown in FIG. 3 and the spherical shape shown in FIG. 5. Even in this case, it is possible to prevent the damping valve (valve device) V from being in a failure state at the normal time, and the characteristics of the passive valve 5 can be set freely.

The valve device according to the present invention does not necessarily have to include the main passage P1 and the main valve body 3. Furthermore, in the present embodiment, the extension side valve 6 and the compression side valve 7 are connected in parallel on the compression side chamber L2 side of the main valve body 3 in the main passage P1, but these may be omitted. In addition, the application of the valve device according to the present invention is not limited to the damping valve of the shock absorber D, and can be appropriately changed. These changes are possible regardless of the configuration of the solenoid valve 4 and the configuration of the passive valve 5.

Although the preferred embodiments of the present invention have been described above in detail, modifications, variations and changes are possible without departing from the scope of the claims.

The invention claimed is:

1. A valve device comprising:
a pressure introducing passage;
a first passage and a second passage connected downstream of the pressure introducing passage;
a solenoid valve that opens the first passage to control an upstream pressure and closes the second passage when energized, and that closes the first passage and opens the second passage when not energized; and
a passive valve provided downstream of the solenoid valve and in the second passage, wherein
the solenoid valve includes a solenoid valve valve body including an opening/closing valve valve body that opens and closes the first passage and the second passage, and a pressure control valve valve body that opens and closes a downstream side relative to the opening/closing valve valve body in the first passage, and
when the solenoid valve is energized, the opening/closing valve valve body opens the first passage and closes the second passage, and a valve opening pressure of the pressure control valve valve body is controlled.

2. The valve device according to claim 1, further comprising:
a tubular valve case into which the opening/closing valve valve body is slidably inserted at an inner periphery, wherein
a first port, of the first passage, serving as an opening/closing portion of the opening/closing valve valve body, and a second port, of the second passage, serving as an opening/closing portion of the opening/closing valve valve body are formed at positions shifted in an axial direction of the valve case,
a pressure control valve valve seat which the pressure control valve valve body is seated on/separated from is provided at an end of the valve case toward the first port, and
the solenoid valve includes a spring that biases the solenoid valve valve body in a direction in which the pressure control valve valve body and the pressure control valve valve seat are away from each other, and a solenoid that applies, to the solenoid valve valve body, a thrust in a direction opposite to a direction of a biasing force of the spring.

3. The valve device according to claim 2, wherein
the passive valve includes a passive valve valve body that is seated on/separated from a passive valve valve seat, and a biasing spring that biases the passive valve valve body toward the passive valve valve seat, and
the passive valve valve seat is provided at an end of the valve case toward the second port.

4. The valve device according to claim 2, further comprising:
a main passage that communicates between one chamber and the other chamber;
an annular valve seat member at the inner periphery of which the main passage is provided; and a main valve body that is seated on/separated from the valve seat member to give resistance to a flow of a liquid passing through the main passage, wherein the pressure introducing passage is configured to reduce a pressure of the one chamber and guide the reduced pressure to a back face of the main valve body as a back pressure, the main valve body includes an annular first valve body member that is seated on/separated from the valve seat member, and a second valve body member that is stacked on the first valve body member opposite to the valve seat member, and that is seated on/separated from the first valve body member, the valve case and the passive valve are attached to the second valve body member, the first valve body member and the second valve body member are biased in a direction away from the valve seat member by a pressure of the one chamber, and the second valve body member is biased in a direction away from the first valve body member by a pressure at an inner periphery of the first valve body member.

5. The valve device according to claim 1, wherein the passive valve includes a passive valve valve body that is seated on/separated from a passive valve valve seat, and a biasing spring that biases the passive valve valve body toward the passive valve valve seat.

6. The valve device according to claim 5, wherein the passive valve valve body has a spherical shape, and the biasing spring is a leaf spring.

7. A shock absorber comprising:

a cylinder;

a piston slidably inserted into the cylinder; and the valve device according to claim 1, wherein the valve device gives resistance to a liquid flow generated when the piston moves in the cylinder.

* * * * *